(12) United States Patent
Huttunen et al.

(10) Patent No.: US 8,223,901 B2
(45) Date of Patent: Jul. 17, 2012

(54) INTERFERENCE IN COMMUNICATION DEVICES

(75) Inventors: Anu Hannele Huttunen, Tampere (FI); Risto Heikki Sakari Kaunisto, Espoo (FI); Andrey V. Belogolovy, Saint Petersburg (RU); Mikhail Y. Lyakh, Saint Petersburg (RU); Alan Edward Waltho, San Jose, CA (US)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 12/601,958

(22) PCT Filed: Jun. 19, 2007

(86) PCT No.: PCT/FI2007/050375
§ 371 (c)(1),
(2), (4) Date: Nov. 25, 2009

(87) PCT Pub. No.: WO2008/145799
PCT Pub. Date: Dec. 4, 2008

(65) Prior Publication Data
US 2010/0177857 A1 Jul. 15, 2010

Related U.S. Application Data

(60) Provisional application No. 60/940,304, filed on May 25, 2007.

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. .................. 375/346; 375/285; 375/350
(58) Field of Classification Search .................. 375/285, 375/346, 350
See application file for complete search history.

(56) References Cited

U.S. PATENT DOCUMENTS

| 6,426,983 | B1 * | 7/2002 | Rakib et al. | 375/346 |
|---|---|---|---|---|
| 6,549,151 | B1 | 4/2003 | Kober et al. | |
| 6,834,073 | B1 * | 12/2004 | Miller et al. | 375/130 |
| 6,959,056 | B2 * | 10/2005 | Yeap et al. | 375/346 |
| 6,996,197 | B2 * | 2/2006 | Thomas et al. | 375/346 |
| 2001/0050987 | A1 * | 12/2001 | Yeap et al. | 379/399.01 |

(Continued)

FOREIGN PATENT DOCUMENTS
EP 1176731 A1 1/2002
(Continued)

OTHER PUBLICATIONS

Gonzalez, O. et al., "Narrowband Interference detection in Multiband UWB Systems", IEEE/Sarnoff Symposium on Advances in Wired and Wireless Communication, Apr. 18-19, 2005, Princeton, NJ USA.

(Continued)

*Primary Examiner* — Jean B Corrielus
(74) *Attorney, Agent, or Firm* — Locke Lord LLP

(57) ABSTRACT

A wideband signal comprising both a wanted signal and narrowband interference is received in a wideband receiver. The receiver comprises an interference detection unit comprising a set of sub-band filters. With the aid of the sub-band filters the received signal is processed to detect a sub-band containing the narrowband interference in time domain.

13 Claims, 12 Drawing Sheets

U.S. PATENT DOCUMENTS

| | | | |
|---|---|---|---|
| 2002/0076034 A1* | 6/2002 | Prabhu et al. | 379/390.02 |
| 2003/0016771 A1 | 1/2003 | Nuutinen et al. | |
| 2003/0179840 A1 | 9/2003 | Oh et al. | |
| 2005/0058230 A1* | 3/2005 | Thomas et al. | 375/347 |
| 2005/0190867 A1 | 9/2005 | Sobchak et al. | |
| 2007/0082638 A1* | 4/2007 | Panfilov et al. | 455/224 |

FOREIGN PATENT DOCUMENTS

| | | |
|---|---|---|
| JP | 2004135234 | 10/2002 |
| WO | 2005107088 | 4/2004 |

OTHER PUBLICATIONS

Poor, H. et al., "Narrowband Interference Suppression in Spread Spectrum CDMA", IEEE Personal Communications, Third Quarter 1994.

"International Search Report and Written Opinion of the International Searching Authority", received in corresponding PCT Application No. PCT/FI2007/050375, Dated Feb. 5, 2008, 10 pages.

* cited by examiner

INTERFERENCE IN COMMUNICATION DEVICES

This application is a 371 of PCT Application No. PCT/FI2007/050375 filed Jun. 19, 2007, which claims priority to U.S. Provisional Application No. 60/940,304 filed May 25, 2007.

FIELD OF THE INVENTION

The present invention generally relates to interference in communication devices. The invention relates particularly, though not exclusively, to radio frequency narrowband interference which is produced by a transmitter using a first radio technology and which interferes reception in a receiver using a second radio technology.

BACKGROUND OF THE INVENTION

Many current and future generations of communication devices, such as mobile handsets, ultra mobile devices (UMD) and laptop PCs (Personal Computer) have wireless transmitters and/or receivers of different communication technologies integrated into a single or same host device. These communication technologies may involve, for example, cellular radio technologies, such as GSM (Global System for Mobile communication), PCS (Personal Communications Services) and $3^{rd}$ generation mobile radio technologies, as well as other communication technologies, such as WLAN (Wireless Local Area Network) and/or WiMAX (Worldwide Interoperability for Microwave Access) and/or DVB (Digital Video Broadcasting) radio technologies.

As a result of the international frequency assignments to which different communication devices must adhere, certain harmonics of certain cellular phone channels, for example, can fall into the channel in use in another receiver, such as a WLAN or WiMAX or DVB receiver. If the frequency bands of different technologies as such are not overlapping, it may still be that at least one harmonic frequency used in one radio technology falls into the receiving band of another radio technology. For example, the third harmonic of a GSM specific transmission frequency currently falls into a certain WLAN channel.

The interference caused by a transmitter to a receiver is understood to be narrowband interference if the majority of the interfering energy concentrates into a small sub-band which represents only a portion or a fraction of the total reception channel in use. For example, WLAN, WiMAX and DVB are wideband (or broadband) technologies using multi-carrier modulation and channel widths which are far broader than, for example, the bandwidth of a typical cellular transmission channel. Therefore, the basic cellular interference to these wideband systems may be considered as narrowband interference.

The source of interference, that is the interfering transmitter, may reside either in the same device which comprises the interfered receiver or in a separate device which is located nearby. Even when the source of interference resides in the nearby located device, the level of interference may be high enough to block the reception in the interfered receiver.

SUMMARY

According to a first aspect of the invention there is provided an apparatus, comprising:
a wideband receiver configured to receive a wideband signal comprising both a wanted signal and narrowband interference; and
an interference detection unit configured to detect the presence of the narrowband interference in time domain, wherein the interference detection unit comprises a set of sub-band filters for processing the received signal to detect a sub-band containing the narrowband interference.

The interference may originate from a cellular or non-cellular transmitter. For the purposes of some embodiments, interference is understood to be narrowband interference if the majority of the interfering energy concentrates into a small sub-band which represents only a fraction of the total reception channel in use. In some embodiments, the interference may be considered narrowband interference in case the interference bandwidth is 30 times narrower than the signal bandwidth. In some other embodiments, the interference may be considered narrowband interference in case the interference bandwidth is anything that enables detecting it by using said set of sub-band filters.

In an embodiment, the apparatus is arranged so that interference free sub-bands are selected for packet detection while other processing of the received signal is carried out based on the total received signal.

According to a second aspect of the invention there is provided a method, comprising:
receiving a wideband signal comprising both a wanted signal and narrowband interference; and
detecting the presence of the narrowband interference in time domain, wherein when detecting the presence of the narrowband interference, a sub-band containing the narrowband interference is detected by using a set of sub-band filters.

In an embodiment, the method may be implemented in an apparatus comprising different blocks or units for performing different functions. Said blocks or units may be implemented by one or more physical hardware modules with one or more software and/or firmware module.

According to a third aspect of the invention there is provided a computer readable medium having stored thereon a computer program executable in an apparatus, the computer program comprising:
program code for controlling reception of a wideband signal comprising both a wanted signal and narrowband interference; and
program code for controlling an interference detection unit configured to process the received signal to detect the presence of the narrowband interference in time domain, wherein the interference detection unit comprises a set of sub-band filters for detecting a sub-band containing the narrowband interference.

According to a fourth aspect of the invention there is provided an interference detector, comprising:
a set of sub-band filters configured to filter a received wideband signal comprising both a wanted signal and narrowband interference; and
a comparison unit configured to compare the level(s) of the wideband signal filtered by the set of sub-band filters to detect a sub-band containing the narrowband interference.

According to a fifth aspect of the invention there is provided an apparatus, comprising:
receiving means configured to receive a wideband signal comprising both a wanted signal and narrowband interference; and detecting means configured to detect the presence of the narrowband interference in time domain, wherein
the detecting means comprise a set of sub-band means for processing the received signal to detect a sub-band containing the narrowband interference.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

Figure 1:
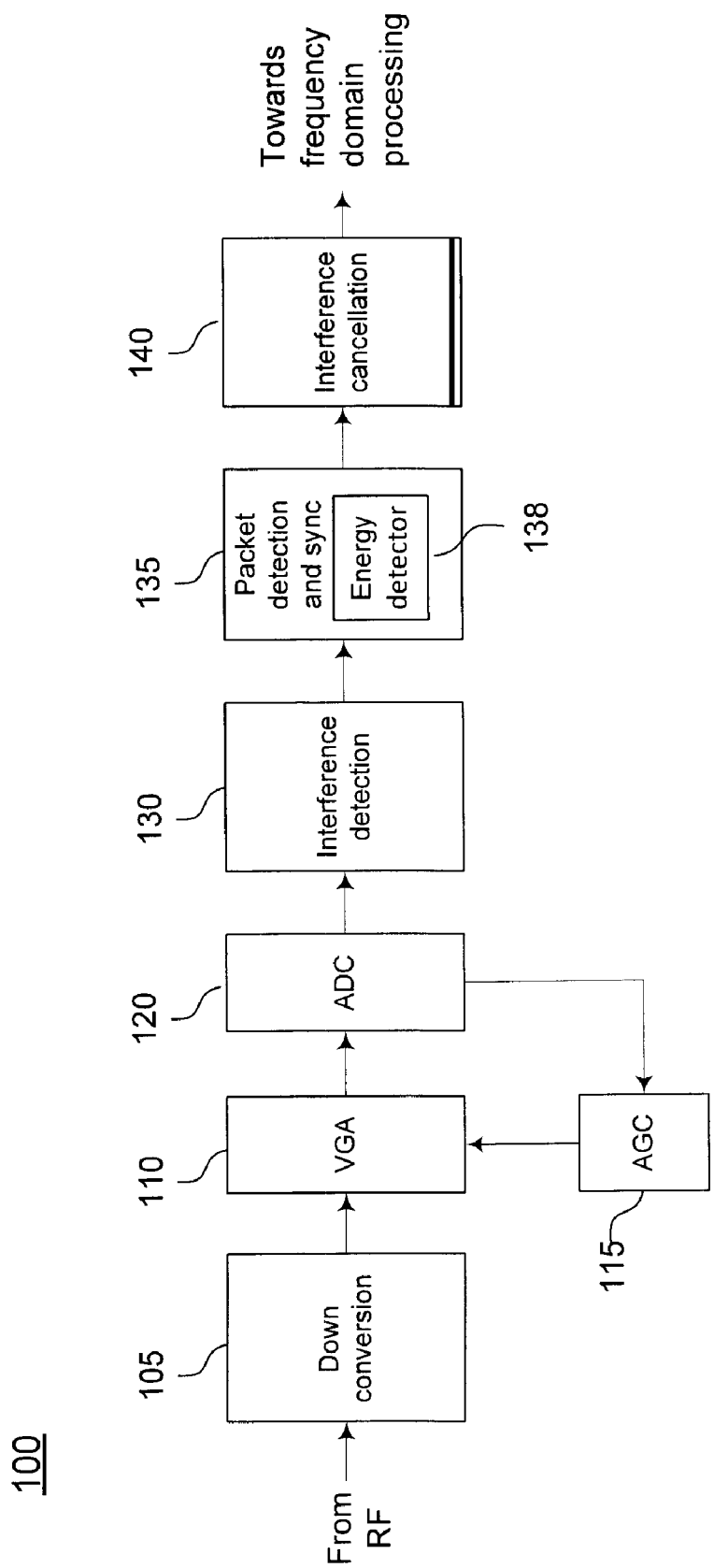
FIG. 1 shows a wideband receiver in accordance with an embodiment of the invention.

FIG. 1 shows a set of operational blocks in a wideband receiver 100 according to an embodiment of the invention. The wideband receiver may be a digital broadband broadcast receiver based on multi-carrier modulation or OFDM (Orthogonal Frequency Division Multiplexing). Examples of applicable wideband technologies include, inter alia, the following: WLAN, WiMAX, DVB technologies, such as, Digital Video Broadcast—Terrestrial (DVB-T) and Digital Video Broadcast—Handheld (DVB-H), Integrated Services Digital Broadcasting—Terrestrial (ISDB-T); 1seg, Digital Multimedia Broadcast-Terrestrial/Handheld (DMB-T/H), Terrestrial Digital Multimedia Broadcasting (T-DMB), Digital Audio Broadcasting (DAB), Digital Radio Mondiale (DRM), Forward Link Only (FLO), MediaFLO, Multimedia Broadcast Multicast Service (MBMS) of $3^{rd}$ generation partnership project (3GPP), Broadcast and Multicast Services (BCMCS) of $3^{rd}$ generation partnership project 2 (3GPP2), and data broadcast technologies in accordance with Advanced Television Systems Committee (ATSC) Data Broadcast Standard.

The blocks shown in FIG. 1 represent functions performed in time domain. After radio frequency (RF) processing, the received wideband radio frequency signal is down converted in block 105. The down-converted signal is amplified in a variable gain amplifier (VGA), for example, a voltage controlled amplifier 110. The gain of the amplifier 110 is controlled by an automatic gain control (AGC) signal generated by an automated gain control function 115. The amplified signal is converted from an analog signal into a digital signal in an analog-to-digital converter 120. The output of the analog-to-digital converter 120 is conveyed into a time domain interference detection unit 130. The interference detection unit 130 comprises a narrowband interference detection function which detects the presence of narrowband interference in time domain.

The narrowband interference is produced by a narrowband transmitter. It may be, for example, a cellular transmitter, such as a GSM transmitter. Examples of other technologies having narrowband transmitters are, for example, Digital-Advanced Mobile Phone Service (D-AMPS), Personal Digital Cellular (PDC) cellular technologies, and many more. The narrowband interference may be periodical, such as time division multiple access (TDMA) based periodical interference.

After interference detection unit 130, packet detection and synchronization is carried out in one or more packet detection and synchronization units 135, and the detected interference (as detected in unit 130) is optionally cancelled from the digital signal in time domain by an interference cancellation function 140. After the optional time domain interference cancellation, the digital signal is processed (demodulated and decoded) in frequency domain starting with a Fast Fourier Transform (FFT) or similar.

Figure 2:
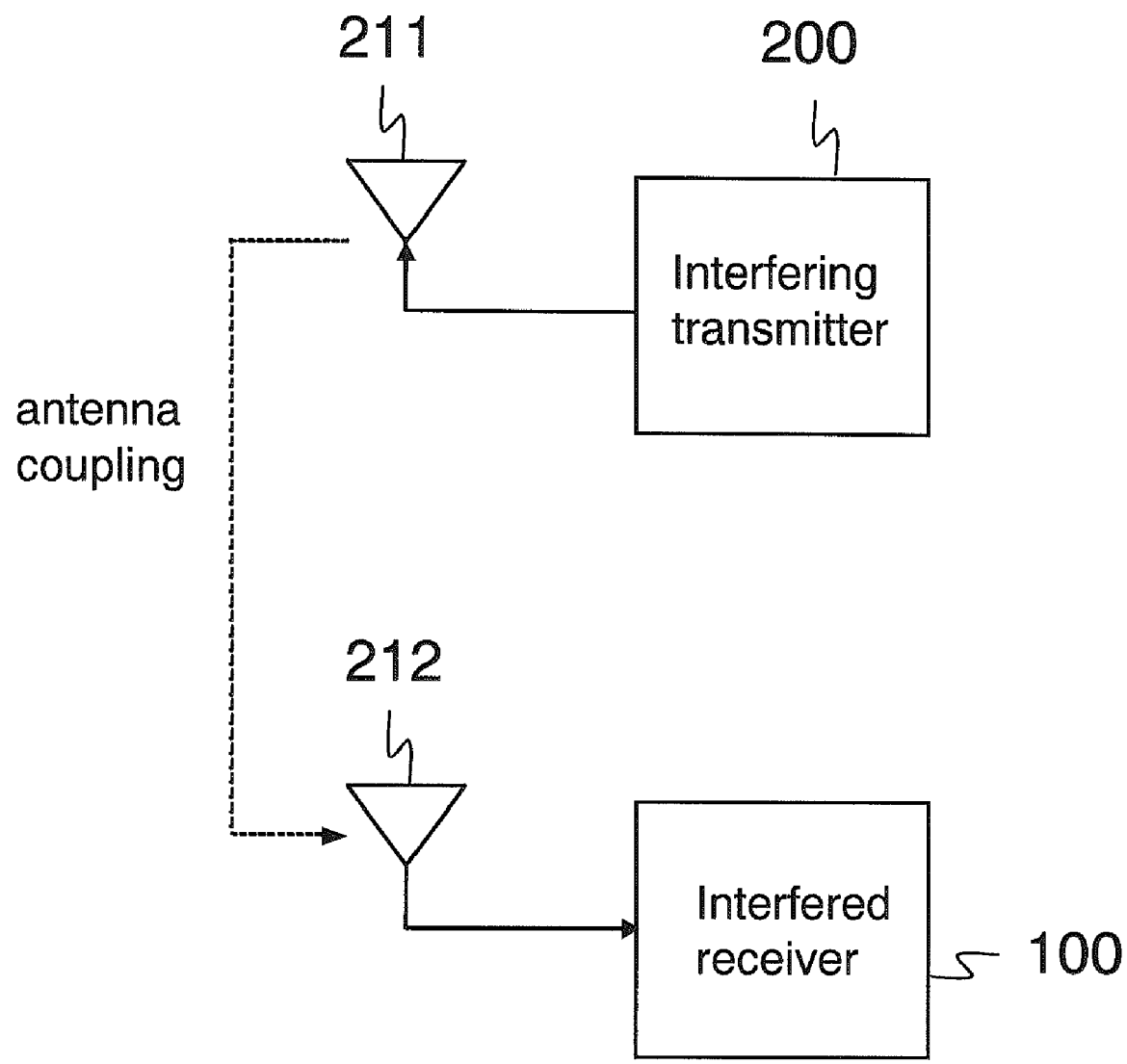
FIG. 2 shows interference coupling between a transmitter and a receiver.

FIG. 2 illustrates interference coupling. The narrowband interference produced by an interfering transmitter 200, for example a GSM transmitter, is coupled via the antenna 211 to the wideband reception antenna 212 (by antenna coupling), and therefrom to the wideband receiver 100, for example a WLAN receiver, resulting in interference in wideband reception.

In accordance of at least one embodiment of the invention, the narrowband interference is detected by using a set of rejection filters. The number n of rejection filters used depends on the implementation. Each of the n rejection filters has typically a rejection bandwidth of 1/n of the used wideband channel bandwidth. In applicable embodiments, the number of the rejection filters is 2 or more.

Figure 3:
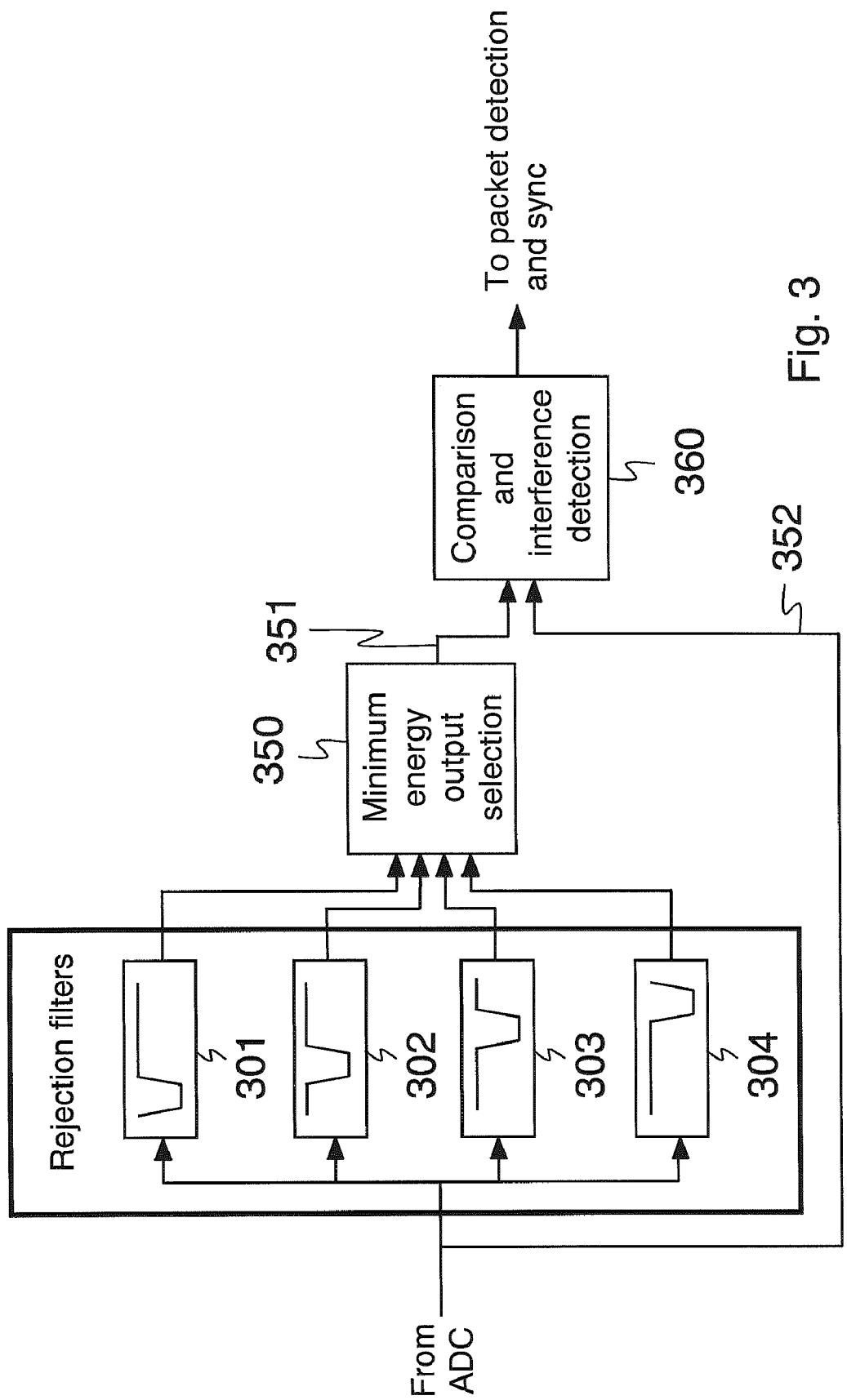
FIG. 3 shows an example for implementing interference detection according to at least one embodiment of the invention.

FIG. 3 shows an example for implementing the interference detection function 130 according to at least one embodiment of the invention. The received digital wideband signal from the analog-to-digital converter 120 is conveyed to each of a set of rejection filters 301-304. In this example arrangement, the number n of the rejection filters is 4. Each rejection filter 301-304 has a rejection sub-band (or bandwidth) of 1/n, here ¼, of the total bandwidth of the received channel. In this embodiment, the sub-bands are not overlapping. Each rejection filter 301-304 thus rejects 1/n, here ¼, of the frequencies of the received spectrum of the wideband signal. In a WLAN case, the channel bandwidth is typically 20 MHz, thus the rejection bandwidth becomes 5 MHz in this example embodiment. In the case of GSM $3^{rd}$ harmonic interference, which is here presented as an example, the bandwidth of the interference is 600 kHz. The rejection filters 301-304 may be implemented, for example, by infinite impulse response (IIR) filters of order 6. The suppression level of each filter may be 40 dB, for example.

In the absence of narrowband interference, the received energy in each of the sub-bands is more or less equal (assuming the wanted signal produces a more or less "flat" spectrum). However, in the presence of narrowband interference one or more of the sub-bands will receive a greater energy level. The presence of narrowband interference can therefore be detected by comparing the outputs or output energy (or power) of the rejection filters 301-304. The comparison can be implemented in various ways, one of those being shown in the example of FIG. 3. In this implementation, the outputs of the rejection filters 301-304 are conveyed to a selector block 350, which selects the rejection filter output having a minimum energy. This output is compared with the total energy received from the analog-to-digital converter output in a comparison and interference detection block 360. If, based on the comparison, it is detected that the output energy level of the rejection filter which has the lowest level is considerably lower than energy level of the n−1 other outputs, here n−1=3, this indicates the presence of narrowband interference in the rejection sub-band of the lowest output filter.

In other words, if the energy (or power) difference between the filtered signal 351 (i.e., the rejection filter output signal which had a minimum energy) and non-filtered signal 352 (i.e., the ADC output signal) is less than a certain threshold value, then a decision is taken that there is no interference. In an embodiment, this threshold value is a bit more than ¼ of the energy of the non-filtered signal. If no interference is present, the non-filtered signal 352 is selected to enter the units 135 for packet detection and synchronization. Otherwise, the filtered (interference free) signal 351 is selected to be used in packet detection and synchronization. It has been observed that although a portion of the signal spectrum (¼ of the total spectrum, in this example) is filtered out, the packet detection and synchronization units 135 can still in many cases operate correctly.

It should be noted that the number n of rejection filters depends on the implementation. For economical reasons the number of filters should be kept low, but on the other hand the number should be large enough to enable detecting a packet based on the filtered signal.

The signal processing in a wideband receiver is understood to comprise a preamble processing phase and a subsequent data extraction phase. The preamble processing phase typically comprises time domain operations in which a preamble portion of a packet is used. Preamble processing may comprise operations, such as signal detection, automatic gain control, diversity selection, coarse frequency offset estimation, packet detection and timing synchronization in time domain. A packet preamble typically also contains information of the length of the packet and data rate used. The data extraction phase, on the other hand, typically comprises operations involving actual data extraction, for example, various demodulation and decoding operations performed in frequency domain.

In an embodiment, when narrowband interference is present, the filtered signal 351 is used for packet detection and timing synchronization, while the rest of the preamble processing and data extraction is performed based of the non-filtered signal 352. When narrowband interference is not present, all operations are performed based on the non-filtered signal 352. This is illustrated in the exemplary embodiment shown in FIG. 4. The arrow leading to packet detection and sync depicts the filtered signal 351 or non-filtered signal 352 (depending on the case) conveyed to the packet detection and synchronization units 135. The arrow leading to other processing depicts the non-filtered signal 352 conveyed to the optional interference cancellation function 140 and to other processing blocks. In another embodiment, the filtered signal 351 is, in addition to packet detection and timing synchronization, also used for coarse frequency offset estimation.

Figure 4:
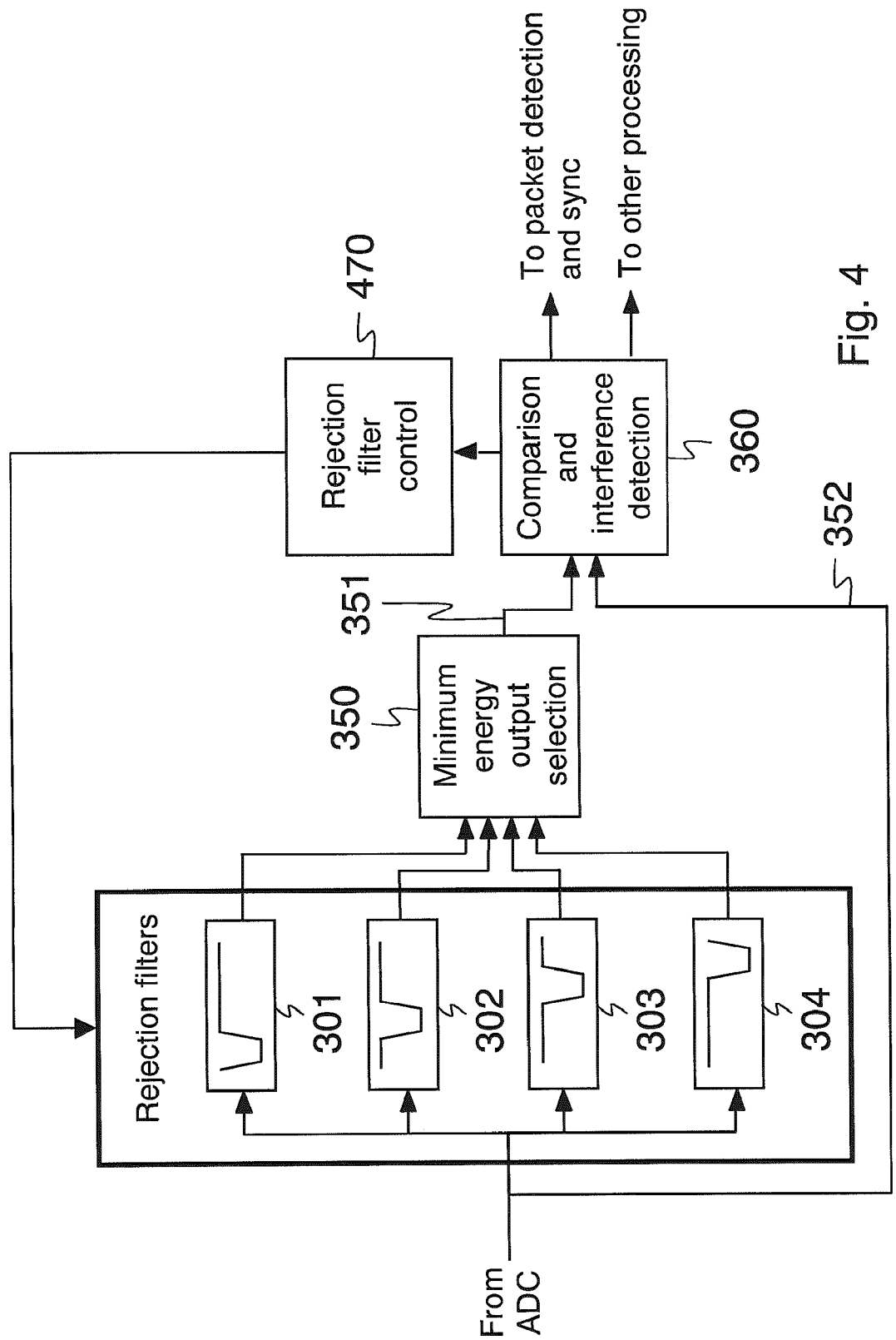
FIG. 4 shows another example embodiment according to at least one embodiment of the invention.

FIG. 4 also shows a rejection filter control function in a control block 470, which controls, in an embodiment, the operation of the rejection filters 301-304. Information about the detected narrowband interference is inputted into the control block 470. The control block 470 controls the rejection filters 301-304 so that after detection of interference all the rejection filters 301-304 but one are switched off, the only rejection filter that continues to operate being the rejection filter that had minimum energy at its output, that is, contains the narrowband interference. The received wideband signal is filtered by that filter only and is forwarded to packet detection and sync without the filtered narrowband interference so that packet detection and synchronization will be based only on (n−1)/n, here ¾, of the spectrum of the received wideband signal, but without the narrowband interference. The rejection filter control function can alternatively be integrated into block 360.

Once narrowband interference has been detected it can be cancelled or otherwise processed in the wideband receiver. The cancellation can be implemented in time domain, for example, by the optional interference cancellation function or unit 140. Examples of time domain interference cancellation methods are presented later in this description.

Now referring back to the embodiment presented in FIG. 1. The mentioned one or more packet detection and synchronization units 135 of the wideband receiver conventionally use an energy threshold detection wake up mechanism (energy detection mechanism 138) to activate and deactivate packet detection and synchronization. The typical operation of this mechanism comprises that when the receiver is receiving a packet and the energy in the reception channel band changes by at least a threshold value (e.g., 3 dB), then the receiver stops packet reception and returns to an idle state. The threshold may be exceeded, for example, when narrowband interference is present, thereby causing the packet reception to be stopped.

Figure 5:
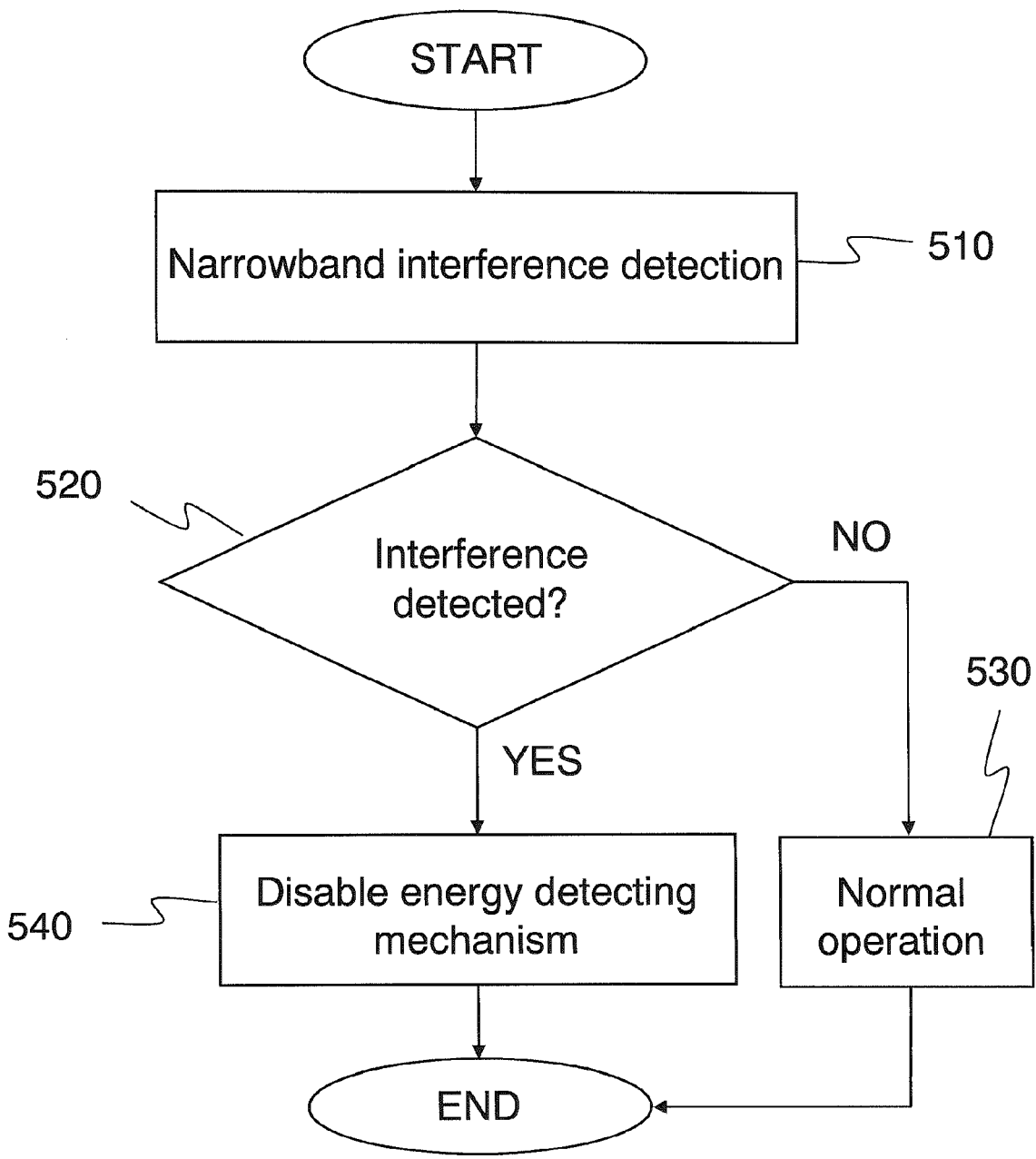
FIG. 5 shows a flow chart in accordance with an embodiment of the invention.

An embodiment shown in the flow chart of FIG. 5 is based on the observed fact that a packet may be correctly received although narrowband interference is present. In step 510, the detection of the presence of narrowband interference is started. The detection can be implemented, for example, in the way presented in FIG. 3 or 4 and related description. In step 520, a decision is made about whether narrowband interference is present. If narrowband interference is not present, normal processing of the received signal is continued (step 530) and the energy detection mechanism is enabled. If narrowband interference is present, information of the presence of interference is passed to a part (block 135 or another additional block or function (not shown)) which disables the energy detection mechanism (step 540).

When the energy detection mechanism is disabled, the wideband receiver does not stop packet reception in the middle of packet reception and does not return to an idle state if the energy threshold is exceeded. Despite this, in many cases packet detection and synchronization functions correctly, although interference is present, if the interference is detected and filtered out, for example, in the way presented in the preceding. Similarly, despite the presence of the interference, the actual packet reception (or data extraction) can be successful in many cases. This can be, for example, if the detected interference is cancelled from the received signal (or mitigated) by an interference cancellation function, such as function 140, in the way(s) described later in this description. In addition, if the level of narrowband interference is low enough, packet reception (or data extraction) may be successful also without interference cancellation. Accordingly, it has been observed that in many cases there is no need to have the energy detection mechanism in operation during narrowband interference.

FIGS. 3 and 4, and related description described an example of detecting narrowband interference according to at least one embodiment of the invention. The wanted channel was sub-divided into four sub-bands. The narrowband interference generally occurs in one but no more than two of the sub-bands depending on the implementation of the invention. Comparison of the energy levels in the four sub-bands therefore allows the interference-to-signal ratio to be estimated and the interference to be compared against a preset threshold. According to at least one embodiment of the invention, a scheme is presented in which the activation of time domain cancellation procedures depends on whether the interference-to-signal ratio exceeds the threshold, wherein time domain cancellation is activated only where the interference-to-signal ratio exceeds the preset threshold. Namely, it has been observed that at low interference-to-signal ratios interference cancellation may be unnecessary since correct demodulation of the wanted signal may be possible in spite of the interference.

In more detail, an exemplary implementation of the scheme assumes that narrowband interference is first detected, for example, with the aid of a set of n sub-band rejection filters (where n=4, for example) as described in the preceding. The set of sub-band filters is used so as to selectively eliminate the portion of the spectrum containing the interference (see FIGS. 3 and 4 and related description). At the output of every rejection filter the energy is compared and if the energy in one sub-band is lower than that in three others by a predetermined threshold value (nominally 3 dB) then a set of interference cancellation or mitigation functions is activated. In the event that the difference in output levels is less than the threshold value, the interference cancellation functions are deactivated. In the event that the interference is sufficiently broad so that it falls into two of the filters then if the level in the two adjacent filters differs from the level in the remaining two filters by the threshold level then interference is deemed to be present and the interference cancellation functions are activated.

Figure 6:
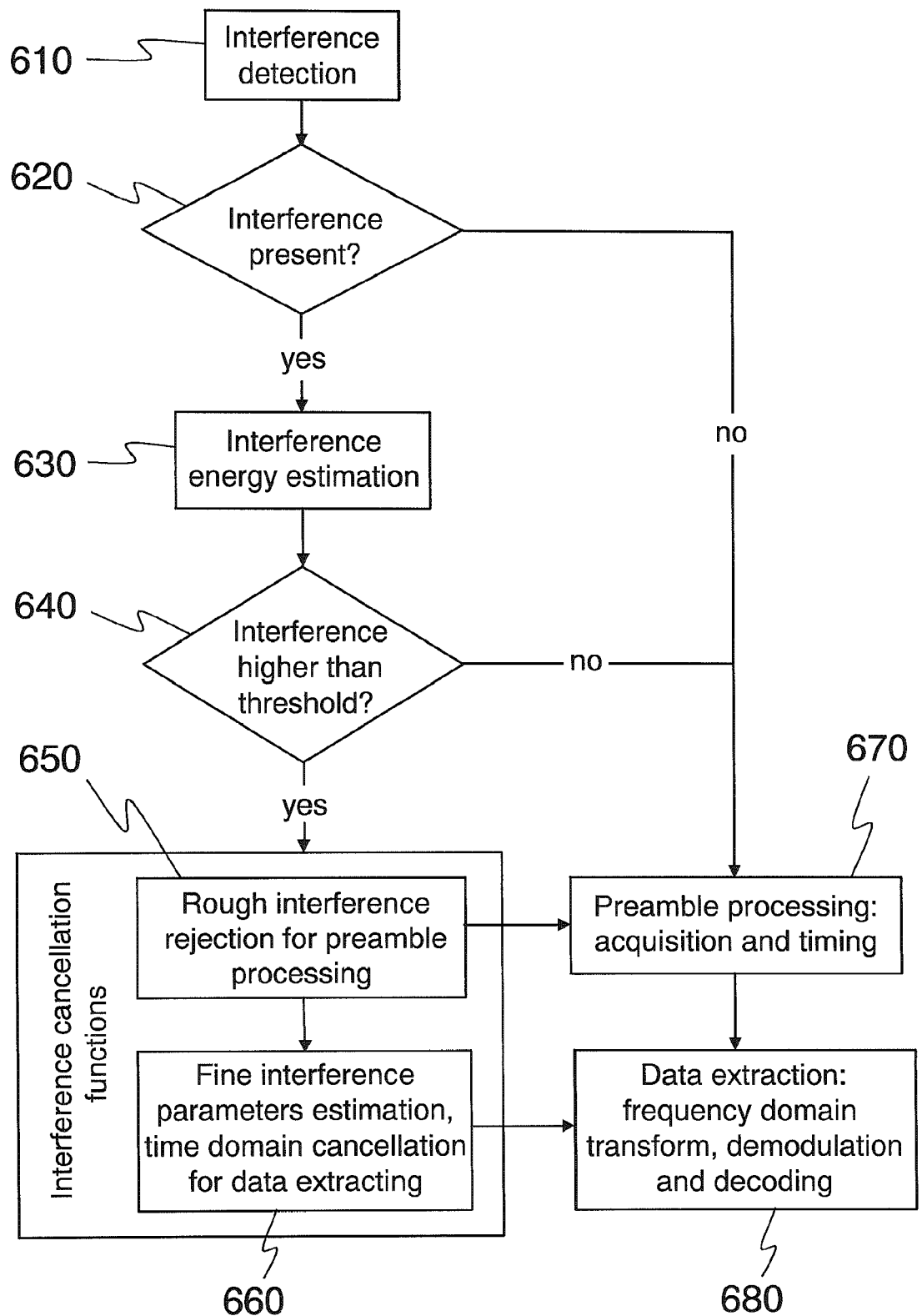
FIG. 6 shows a flow chart in accordance with another embodiment of the invention.

FIG. 6 shows one implementation of the above scheme schematically in a flow chart according to one embodiment of the invention. Step 610 commences narrowband interference monitoring. In step 620, it is checked whether narrowband interference is present. If narrowband interference is not present, normal processing of the received signal is continued in step 670, that is the output from analog-to-digital converter is conveyed to block 670. Preamble processing is carried out. Packet acquisition and timing functions are used in packet detection. Subsequently, data is extracted in step 680 by carrying out a frequency domain transform (for example, Fast Fourier transform (FFT)), demodulation and decoding functions. If narrowband interference is present, the interfering energy is estimated in step 630. In step 640, the interfering energy is compared with a predetermined threshold (3 dB, for example). If the interfering energy is not higher than the threshold, steps 670 and 680 are entered. If the interfering energy is higher than the threshold interference cancellation functions are carried out. For the purpose of FIG. 6, the interference cancellation functions comprise both rough interference rejection 650 for packet preamble processing and fine interference parameters estimation together with time domain cancellation 660 for the data extraction phase.

The rough interference rejection in step 650 may comprise, for example, rejecting (or filtering) the sub-band containing the interference as described in the preceding description so that packet detection (or acquisition) and synchronization timing in step 670 can be carried on the filtered signal. The more sophisticated interference cancellation function 660 is typically carried out based on the non-filtered ADC output signal. It may comprise, for example, estimating one or more fine interference parameters for time domain cancellation algorithm(s), and carrying out the algorithm(s) to cancel or mitigate interference. The transmitted digital data is extracted in block 680 by performing a frequency domain transform (FFT or similar), demodulation and decoding operations, and taking advantage of information received from the preamble processing phase 670.

It is considered that the above presented scheme is computationally simple and also enables the more computationally intensive interference cancellation algorithms to be deactivated when not required.

In another embodiment, the threshold (or limits) for taking the different interference cancellation functions into use may be different for the rough interference rejection 650 and the more sophisticated interference cancellation function 660. In an embodiment, the block 660 containing more sophisticated interference cancellation algorithm(s) may be taken into use only when a higher limit than defined for block 650 containing rough interference rejection is exceeded.

The following description presents examples of time domain interference cancellation methods (said more sophisticated cancellation methods 660 mentioned in FIG. 6), which can be carried out by the interference cancellation function or block 140 in order to cancel or mitigate narrowband interference from the wanted signal according to at least one embodiment of the invention. Conventionally, filtering techniques or tone puncturing methods (in which certain sub-carriers are blanked) have been used to remove narrowband interference from the wanted signal. Different filtering methods, however, can also cause a loss of data since they also remove a part of the wanted signal. Other cancellation techniques can overcome the limitation of filtering but require an accurate replication of the interference so that it may be subtracted from the combined signal of interference plus wanted signal. Conventionally, the replication of the interference has been obtained from a cross connected copy of the interference signal or by means of two or more independent paths so that the interference can be separated from the wanted signal.

In the present embodiment, to the contrary, interference is estimated taking advantage of the fact that the interfering signal levels of concern are greater than the level of the desired signal, and that the interference is narrowband interference by its nature. Hence the received signal can be sampled, and a best fit to the interference can be estimated over a sampling period. By sampling the received signal (containing both data plus interference) it is possible to estimate the narrowband waveform that constitutes the interference. The estimated interference is then regenerated in an anti-phase with respect to the incoming signal and combined with a delayed version of the received signal to cancel the interference.

In more detail, after the received signal has been down-converted around zero frequency, a smooth function is fitted to the received (data plus interference) signal. The fitted signal represents the interference whereas the data forms a rapidly changing part with lower amplitude. The estimated interference is then subtracted from the received signal. In the case of a WLAN receiver, for example, the narrowband interference is estimated and cancelled separately for each OFDM symbol (each time domain OFDM symbol is treated separately).

Figure 7:
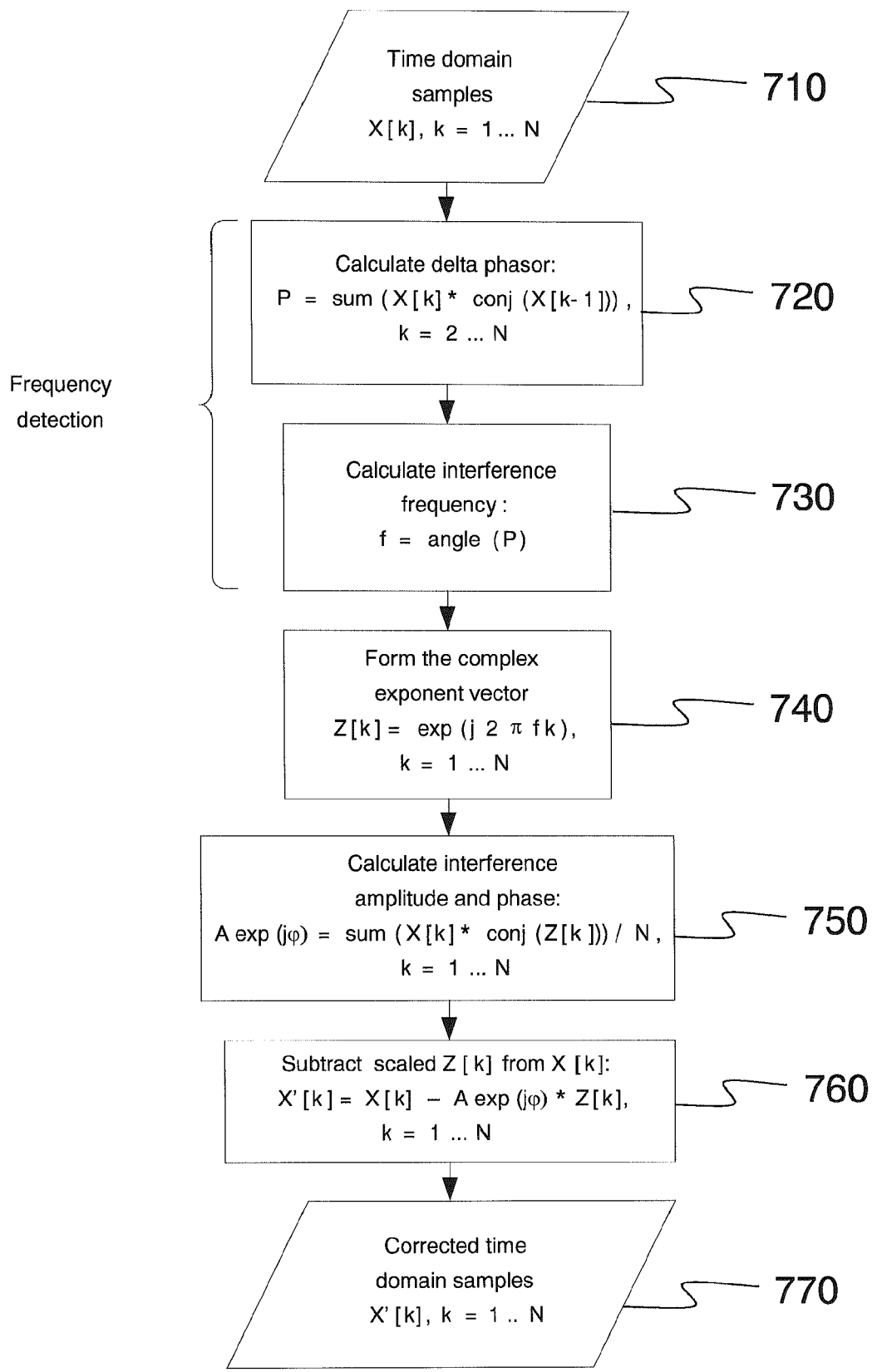
FIG. 7 shown an algorithm for interference cancellation in an embodiment of the invention.

A time domain algorithm which may be used for interference cancellation is presented in FIG. 7. The basic steps of the algorithm include:

Estimate frequency, phase and amplitude of the interference using time-domain samples Generate a waveform (e.g., sine wave or another mathematical function) with the estimated parameters Subtract generated waveform from time-domain signal In this embodiment, the interference waveform is assumed to be a sinusoidal function. An example of a time domain representation of such a function is A cos(2πf t+φ), where f denotes the frequency, A denotes the amplitude and φ denotes a phase. The frequency f phase φ, and amplitude A are determined from the received signal (containing both interference and the wanted signal (or data)). The number of samples used to determine the frequency, phase, and amplitude of the sinusoidal estimate is denoted by N and it may correspond, for example, to the length of an OFDM symbol, but in some cases less (or only a few) samples need to be used.

The received time domain samples are denoted by X[k], where k=1 . . . N (step 710). First, a delta phasor P is calculated in step 720 as:

$$P = \sum_{k=2}^{N} X(k)X^*(k-1),$$

where X(k) is the signal at sample time k, and X*(k) denotes the complex conjugate of X(k). The interference frequency f is determined in step 730 as an angle of P:

$$f = \angle\left(\sum_{k=2}^{N} X[k]X^*[k-1]\right)$$

The frequency f denotes the frequency difference between the interfering (center) frequency and the (center) frequency of the wanted signal, that is, the interference carrier frequency with respect to the signal carrier frequency.

The signal is then down-converted by the frequency f by forming in step 740 a complex exponent vector Z(k):

Z(k)=$e^{j2\pi fk}$, k=1 . . . N where j is the imaginary unit.

The complex amplitude of the interference $Ae^{j\phi}$, including the amplitude A and the phase φ of the interference, is calculated in step 750 as an average over the N time domain samples:

$$Ae^{j\varphi} = \left(\sum_{k=1}^{N} X(k)Z^*(k)\right)/N$$

where Z*(k) is the complex conjugate of Z(k).

The interference estimate (whose complex representation is $Ae^{j\phi}Z[k]$, where k=1 . . . N) with the frequency, phase and amplitude hereby determined is in step 760 subtracted from the original time domain samples X[k]. In an embodiment, the interference estimate is subtracted from a delayed version of the original signal in the sense that the estimate is generated based on the same signal from which it is subsequently subtracted. The samples representing the original signal are kept in a memory in the meantime. The subtraction results in a corrected version of the time domain samples X'[k] where k=1 . . . N (step 770). The corrected version represents the received wanted signal (or OFDM symbol, e.g., in case of WLAN) with interference mitigated or cancelled from the signal. Here it is to be noted that N as mentioned herein denotes the total samples of a transmission symbol (such as an OFDM symbol). Depending on the implementation, N may however differ from the total samples of a transmission symbol. In an embodiment, it may be any suitable length or portion (e.g., expressed in samples) of the received signal. It may also differ from the N defined in the preceding to denote the number of samples which were used to determine the estimate of the interference. This may be true for example in an embodiment in which the total number of samples belonging to a transmission symbol is not used in said determination.

Figure 8A:
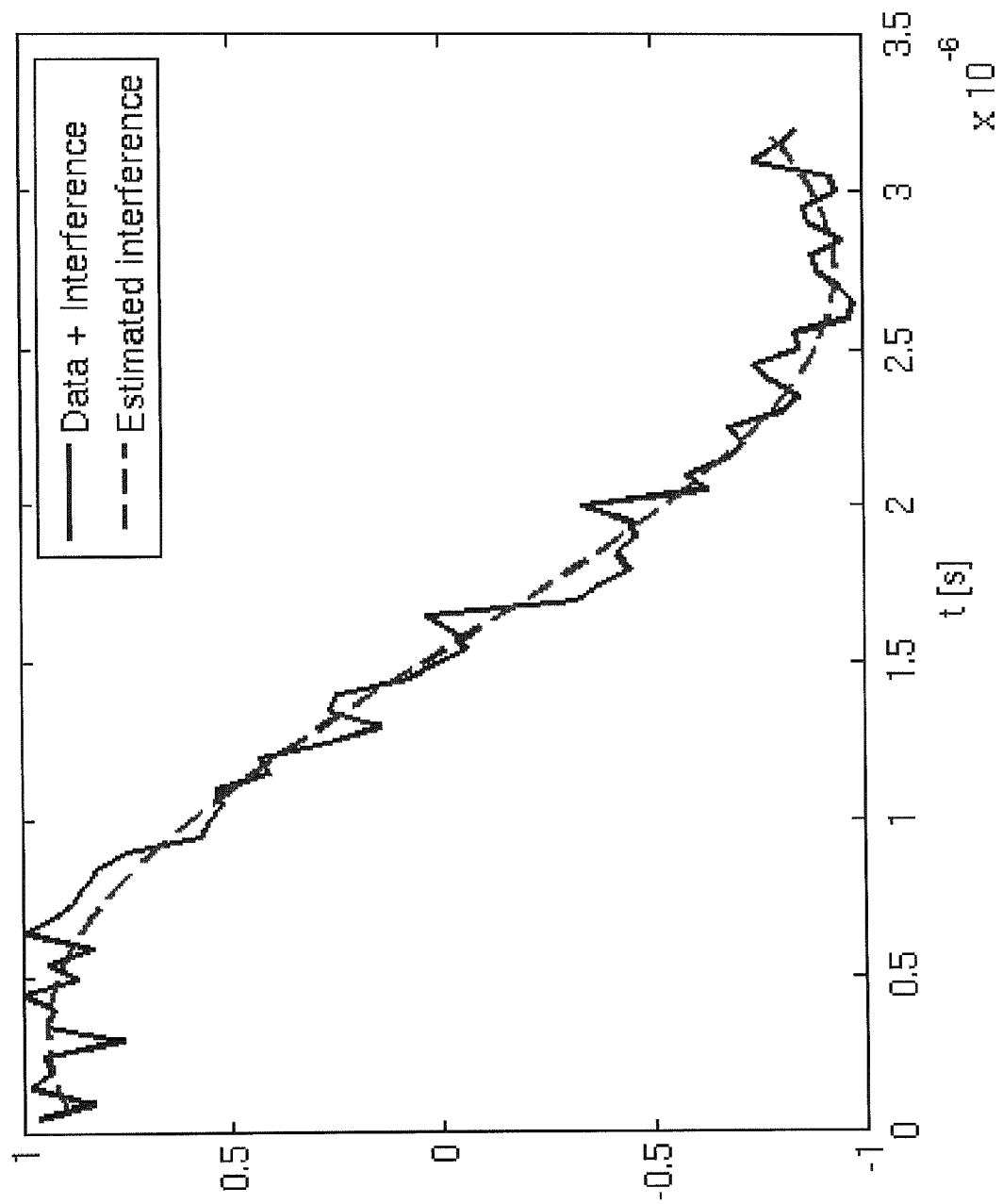
FIG. 8a illustrates an example of an ODFM symbol with narrowband interference.
Figure 8B:
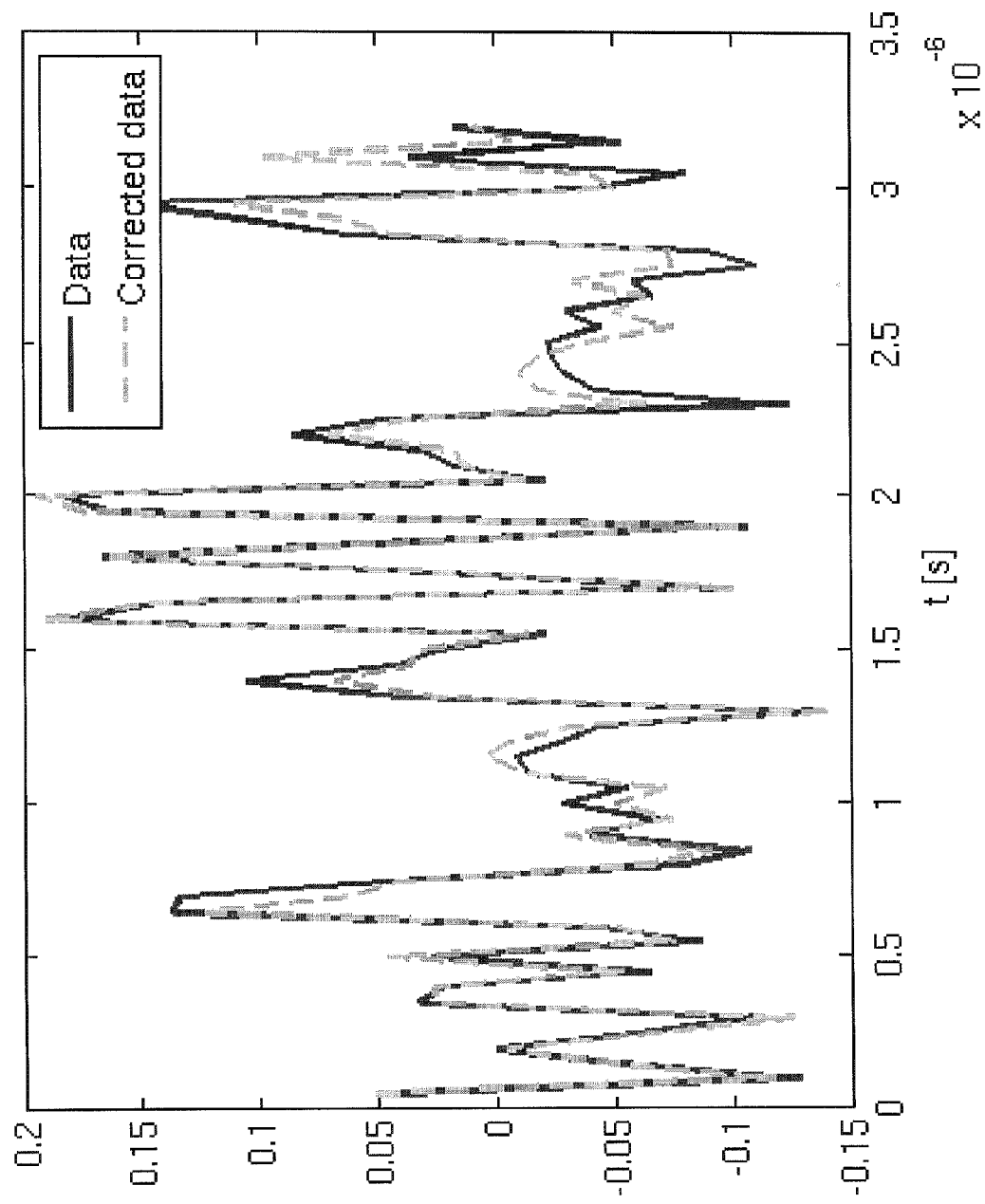
FIG. 8b illustrates a corrected OFDM symbol.

An example of an ODFM symbol with narrowband interference is shown in FIG. 8*a*. The interference is estimated by fitting the sinusoidal function (dashed curve) in the combined waveform of the wanted signal, or data, and interference (solid curve). The estimated interference is then subtracted from the data resulting in a corrected OFDM symbol in FIG. 8*b*. Both the corrected signal (dashed curve) and the ideal signal as it was transmitted, i.e., without interference, (solid curve) are shown.

Simulations for GSM 3rd harmonic interference power 1 to 15 dB larger than WLAN signal power were performed using the time domain cancellation algorithm with the sinusoidal approximation of the interference. The algorithm was able to correct the cyclic redundancy check (CRC) of the WLAN packets up to interference level approximately 15 dB above the signal level depending on the interference carrier frequency.

Further, the above embodiment is computationally simple compared with many other interference cancellation techniques, because it uses a single signal path for interference and wanted signal.

In another embodiment, instead of fitting a sinusoidal function, the narrowband interference can be estimated by fitting a smooth polynomial.

In yet another embodiment, it has been observed that for low interference to signal ratios (ISR) the accuracy of the estimation of the narrowband interference waveform (presented in the preceding, for example, in the context of FIG. 7 and related description) is reduced due to the presence of the wideband wanted signal. In this embodiment, the ISR is enhanced so as to improve the performance of the interference estimation algorithm or similar. The enhancement of the ISR can be obtained, for example, by using a narrowband filter effectively centered at the frequency of the interference. This narrowband filter enhances the ISR by attenuating (or rejecting) the wideband wanted signal (outside of the interfered frequencies) while leaving the interfering signal at its full level. Thus more reliable narrowband interference estimation can be performed.

In a non-limiting example case of GSM 3rd harmonic interference, the bandwidth is 600 kHz and the centre frequency is variable in increments of 600 kHz over the channel bandwidth of the wideband wanted signal, such as a WLAN signal. In such a case, the wideband receiver can be provided with an appropriate 600 kHz bandpass filter centred at the frequency of the interference. In another implementation a bank of contiguous filters can be used, and the filter with the highest output can be selected for filtering out the wanted signal for the interference estimation purpose. In yet another implementation a tracking filter may be scanned across the total band and then set to the frequency corresponding to the highest output (that is the output containing the interference). In yet another embodiment, the received signal, after the analog-to-digital converter, and containing both the interference and wanted signal is first digitally down-converted so that the interference sets around zero frequency. Subsequently, a low pass filter can be used to pass the interference while rejecting the wanted signal.

The narrowband filtering increases the ISR and consequently the interference estimate can be made more accurately. The interference may be estimated as has been explained in the preceding description. The interference estimate is subtracted from the signal containing both the interference and the wanted signal, and the corrected signal is then digitally up-converted back to the original frequency.

The down-conversion frequency offset is determined, for example, by calculating the interference carrier frequency with respect to the signal carrier frequency as described in the preceding description. One possible algorithm has been shown in FIG. 7 and in related description. In an embodiment, in case where the possible interfering frequencies are already known (e.g. known GSM frequencies), the known frequency closest to the calculated estimate can be selected for down-conversion.

Figure 9:
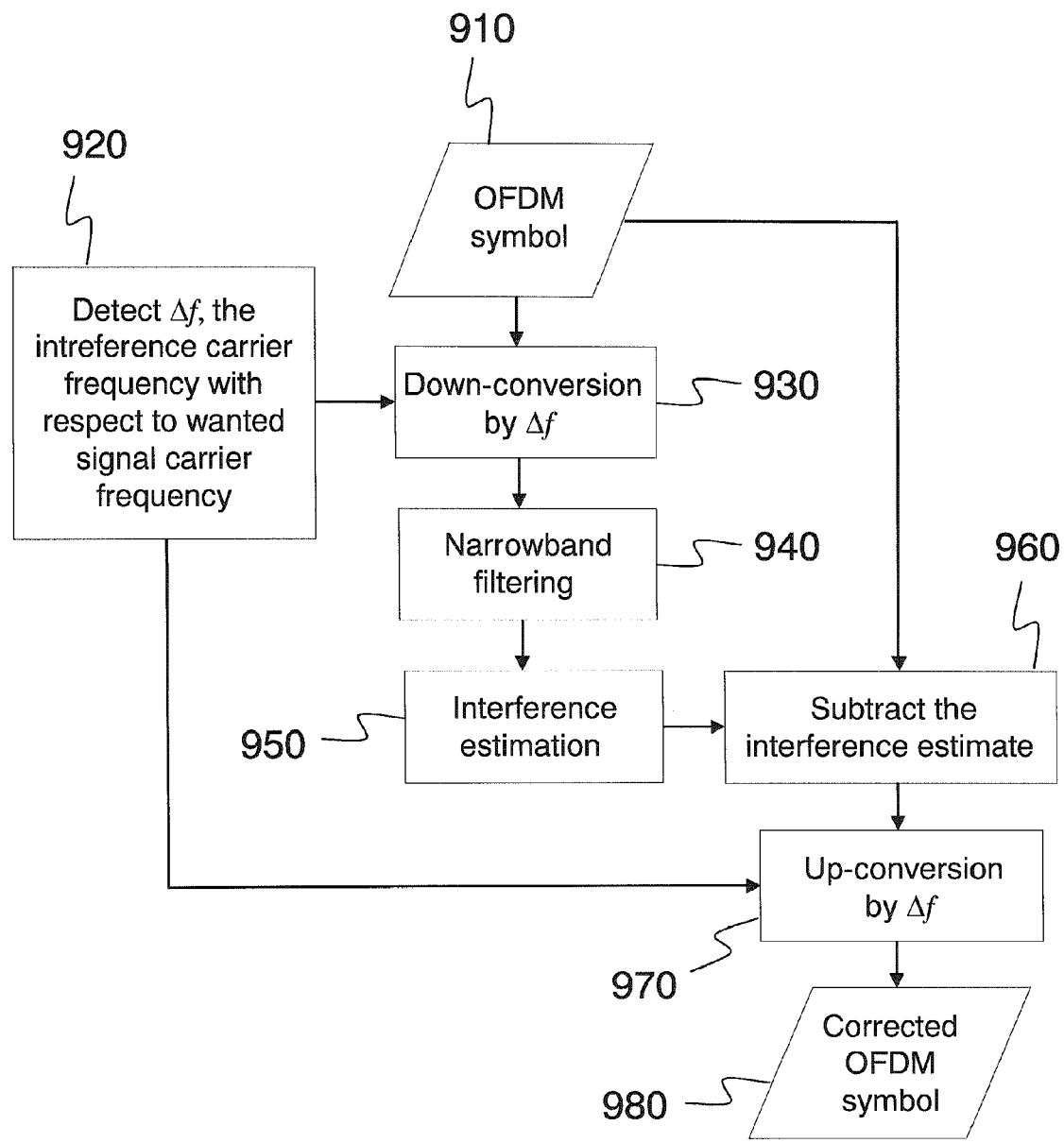
FIG. 9 shows schematically another embodiment of the invention.

FIG. 9 shows schematically an embodiment of the invention in which the ISR is enhanced so as to improve the interference estimation. In step 920, the frequency difference $\Delta f$ between the interference carrier and wanted signal carrier is determined. This difference has also been denoted as the frequency f in the preceding description. The received data 910, that is, an OFDM symbol in a multicarrier modulation or WLAN case, is digitally down-converted by $\Delta f$ in step 930. As a result, the narrowband interference shifts around zero frequency. The down-converted data is low-pass filtered in step 940. The low pass filter is selected so that it only passes frequencies that are close to zero frequency, that is, a frequency band on which the interference resides. The ISR is thereby enhanced. In step 950, an interference estimate is generated by fitting a suitable mathematical function on the output received from step 940. In step 960, the estimate is subtracted from the received data 910. The result is up-converted by $\Delta f$ in step 970 to form the corrected version of the received data, or corrected OFDM symbol 980.

In the preceding example embodiment, the interference estimate and subtraction were performed before the up-conversion. However, in another embodiment, depending on the implementation, the interference estimation and subtraction may be both performed only after the up-conversion.

Figure 10:
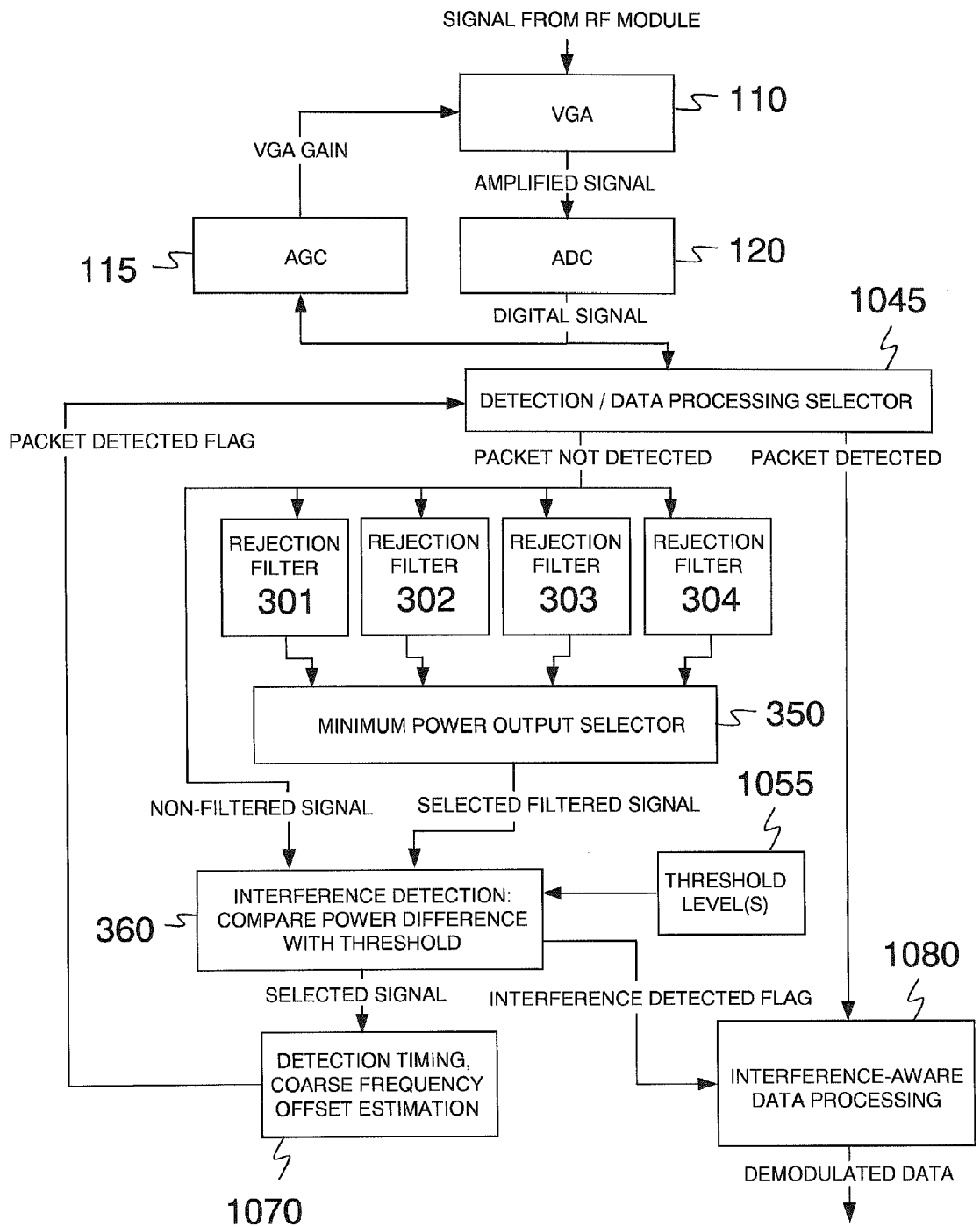
FIG. 10 yet illustrates an embodiment of the invention.

FIG. 10 yet illustrates an embodiment of the invention for interference mitigation. The signal received from radio frequency processing module(s) in a wideband receiver is conveyed into a variable gain amplifier 110. The signal is amplified by a gain determined by an automatic gain control 115. The amplified signal is conveyed to an analog-to-digital converter 120 which generates time-domain samples in order to convert the signal from analog to digital domain. The digital signal is conveyed to a detection/data processing selector 1045.

The selector 1045 passes the signal to a set of rejections filters 301-304. Each rejection filter 301-304 has a rejection sub-band so that the rejection sub-bands of said set of rejection filters altogether substantially cover the total bandwidth of the received channel. The sub-bands are not substantially overlapping. A minimum power output selector 350 selects the output which has the minimum power and conveys this filtered signal to block 360 which compares the filtered signal with the non-filtered signal received from selector 1045. The comparison is subsequently compared with a pre-defined threshold level received from block 1055 in order to detect the presence of narrowband interference. Narrowband interference is present if the latter comparison result exceeds the threshold (basic principles of comparing against threshold have been presented in the preceding description).

If narrowband interference is present, the filtered signal is selected by the interference detection block 360 to proceed to packet preamble processing in block 1070. If narrowband interference is not present, the non-filtered signal is selected by block 360 to proceed to packet preamble processing. Upon detecting a packet, a packet detected flag (e.g., a certain bit or set of bits) is sent to the selector 1045, which conveys the received digital domain signal into a data processing block 1080 for further processing in a reception chain. After having gone through the total reception chain, demodulated data is finally obtained.

In case narrowband interference is present, the interference detection block 360 sends an interference detected flag to block 1080 so that the data processing block 1080 is made aware of the presence of narrowband interference. Block 1080 can then selectively apply various interference cancellation or mitigation schemes on the received digital data.

Figure 11:
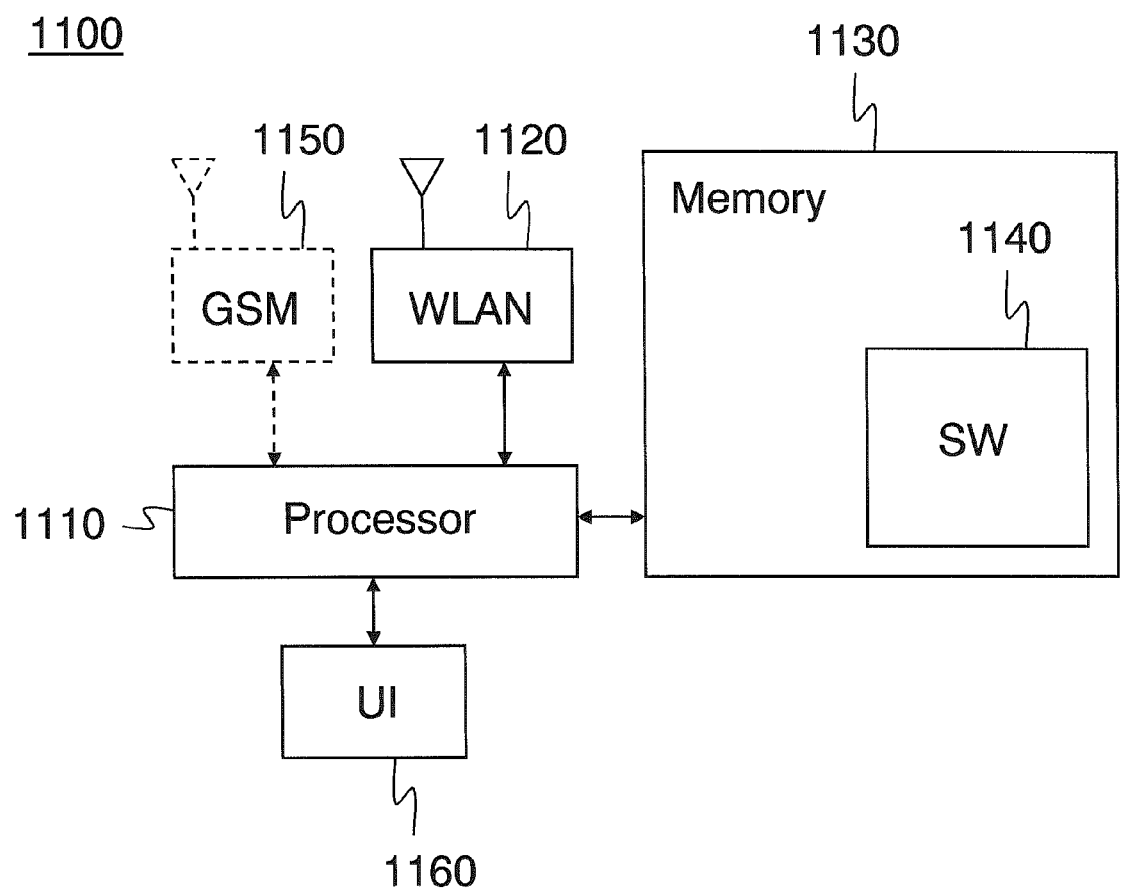
FIG. 11 shows a simplified block diagram of an apparatus in accordance with at least one embodiment of the invention.

FIG. 11 shows a simplified block diagram of an apparatus in accordance with at least one embodiment of the invention. The apparatus may be a wireless handheld user terminal. The apparatus 1100 comprises a processing unit (or processor) 1110, wideband reception hardware 1120 coupled to the processing unit 1110 and antenna, and a memory 1130 coupled to the processing unit 1110. The memory 1130 comprises stored software (or software modules) 1140 which is executable in the processing unit 1110. The wideband reception hardware 1120, may be arranged in a set of separate physical hardware blocks or modules. The apparatus may optionally comprise cellular transmitter (or transceiver) hardware 1150 coupled to the processing unit 1110 and an antenna.

Software 1140 comprises wideband reception software, which comprises program code executable in the processor 1110 for performing software operations relating to data reception, such as interference detection control of interference which may be caused by the cellular transmitter 1150 or by another device. By software 1140 can be performed various calculations/algorithms relating, for example, to interference cancellation, and other control of hardware modules. If the apparatus comprises the optional cellular network functionality, software 1140 can comprise cellular communications software, which performs software operation relating to the cellular transmission (and reception). The apparatus 1100 further comprises a user interface 1160 enabling the user to use the apparatus 1100. The user interface 1160 is coupled to the processing unit 1110 and typically comprises one or more input and output devices. These may contain, for example: a display and speaker(s), a keyboard, a microphone, a camera, and optionally a separate display and/or speafor cellular voice call and other cellular operation.

In another embodiment, the software 1140 may comprise firmware or a combination of software and firmware. The apparatus 1100 may be a mobile phone capable of digital broadband broadcast reception. It may be, depending on the embodiment, a mobile or fixed device. It may be a digital television receiver or another electronic device (for example an electronic home appliance) which is able to receive wideband transmissions, such as WLAN transmissions, for example, in a personal or public network.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. An apparatus, comprising:
a wideband receiver configured to receive a wideband signal comprising both a wanted signal and narrowband interference;
an interference detection unit configured to detect the presence of the narrowband interference in the time domain, wherein the interference detection unit comprises a set of sub-band filters, said interference detection unit further configured to process the wideband signal to detect a sub-band containing the narrowband interference, wherein detecting the sub-band containing the narrowband interference comprises selecting an output of a sub-band filter of the set of sub-band filters whose energy level is less than an energy level output of the other sub-band filters of the set of sub-band filters and determining whether a difference between the energy level of the selected output and an energy level of the wideband signal exceeds a threshold;
a packet detection and synchronization unit configured, when narrowband interference is detected, to perform packet preamble detection and synchronization in the time domain using an output of a sub-band filter of the set of sub-band filters that filters the sub-band containing the narrowband interference from the wideband signal; and
an interference cancellation unit configured, when narrowband interference is detected, to generate a time domain signal representing the wanted signal, for use in data extraction in the frequency domain, by estimating at least one parameter of the narrowband interference using time domain samples and subtracting a waveform generated using the at least one estimated parameter from the wideband signal.

2. The apparatus of claim 1, wherein the set of sub-band filters is implemented by a set of non-overlapping rejection filters.

3. The apparatus of claim 1, wherein the apparatus is configured to select interference free sub-bands for a packet detection function.

4. The apparatus of claim 2, wherein the number of rejection filters is an integer n greater than or equal to 2 and each of said n rejection filters has a rejection bandwidth of 1/n of the total channel bandwidth.

5. The apparatus of claim 1, wherein the packet detection and synchronization unit further comprises:
an energy detector configured to activate and deactivate packet detection, wherein the apparatus is configured to disable the operation of the energy detector in response to detecting presence of narrowband interference.

6. A method, comprising:
receiving a wideband signal comprising both a wanted signal and narrowband interference; and
detecting the presence of the narrowband interference in the time domain, wherein when detecting the presence of the narrowband interference, a sub-band containing the narrowband interference is detected by using a set of sub-band filters, wherein detecting the sub-band containing the narrowband interference comprises selecting an output of a sub-band filter of the set of sub-band filters whose energy level is less than an energy level output of the other sub-band filters of the set of sub-band filters and determining whether a difference between the energy level of the selected output and an energy level of the wideband signal exceeds a threshold;
performing, when narrowband interference is detected, packet preamble detection and synchronization in the time domain using an output of a sub-band filter of the set of sub-band filters that filters the sub-band containing the narrowband interference from the wideband signal; and
generating, when narrowband interference is detected, a time domain signal representing the wanted signal, for use in data extraction in the frequency domain, by estimating at least one parameter of the narrowband interference using time domain samples and subtracting a waveform generated using the at least one estimated parameter from the wideband signal.

7. The method of claim 6, wherein the set of sub-band filters is implemented by a set of non-overlapping rejection filters.

8. The method of claim 6, comprising:
selecting interference free sub-bands for a packet detection function.

9. The method of claim 7, wherein the number of rejection filters is an integer n greater than or equal to 2 and each of said n rejection filters has a rejection bandwidth of 1/n of the total channel bandwidth.

10. The method of claim 6, comprising:
disabling operation of an energy detection mechanism in response to detecting presence of narrowband interference, the energy detection mechanism being normally used to activate and deactivate packet detection.

11. A computer-program product comprising a non-transitory computer readable medium having stored thereon computer readable program code, which when executed by a processor, causes an apparatus to perform:
controlling reception of a wideband signal comprising both a wanted signal and narrowband interference; and
detecting the presence of the narrowband interference in the time domain, wherein when detecting the presence of the narrowband interference, a sub-band containing the narrowband interference is detected by using a set of sub-band filters, wherein detecting the sub-band containing the narrowband interference comprises selecting an output of a sub-band filter of the set of sub-band filters whose energy level is less than an energy level output of the other sub-band filters of the set of sub-band filters and determining whether a difference between the energy level of the selected output and an energy level of the wideband signal exceeds a threshold;
performing, when narrowband interference is detected packet preamble detection and synchronization in the time domain using an output of a sub-band filter of the set of sub-band filters that filters the sub-band containing the narrowband interference from the wideband signal; and
generating, when narrowband interference is detected, a time domain signal representing the wanted signal, for use in data extraction in the frequency domain, by estimating at least one parameter of the narrowband interference using time domain samples and subtracting a waveform generated using the at least one estimated parameter from the wideband signal.

12. A computer program product according to claim 11, wherein the computer readable program code further comprises code, which when executed by a processor, causes an apparatus to perform:

disabling operation of an energy detection mechanism in response to detecting presence of narrowband interference, the energy detection mechanism being normally used to activate and deactivate packet detection.

13. An interference detector, comprising:

a set of sub-band filters configured to filter a received wideband signal comprising both a wanted signal and narrowband interference; and a comparison unit configured to detect a sub-band containing the narrowband interference by determining whether a difference between, an energy level of an output of a sub-band filter of the set of sub-band filters whose energy level is less than an energy level output of the other sub-band filters of the set of sub-band filters, and an energy level of the wideband signal, exceeds a threshold.

* * * * *